US009449323B2

(12) United States Patent
Mikan et al.

(10) Patent No.: US 9,449,323 B2
(45) Date of Patent: Sep. 20, 2016

(54) METHOD AND APPARATUS FOR MONITORING USAGE OF ITEMS

(75) Inventors: Jeffrey Mikan, Atlanta, GA (US); Andrea Basso, Marlboro, NJ (US); Tara Hines, New York, NY (US); Aleksey Ivanov, Atlantic Highlands, NJ (US); Nadia Morris, Decatur, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

(21) Appl. No.: 13/188,491

(22) Filed: Jul. 22, 2011

(65) Prior Publication Data

US 2013/0024301 A1    Jan. 24, 2013

(51) Int. Cl.
*G06Q 30/00* (2012.01)

(52) U.S. Cl.
CPC ...................... *G06Q 30/01* (2013.01)

(58) Field of Classification Search
USPC .......................................................... 340/572
See application file for complete search history.

(56) References Cited

U.S. PATENT DOCUMENTS

| | | | |
|---|---|---|---|
| 6,943,672 | B2 | 9/2005 | Choi |
| 6,965,871 | B1 | 11/2005 | Szabo et al. |
| 7,299,982 | B2 | 11/2007 | Kreiner |
| 7,362,228 | B2 | 4/2008 | Nycz |
| 7,367,496 | B2 | 5/2008 | Karstens |
| 7,426,479 | B2 | 9/2008 | Otto |
| 7,827,846 | B2 | 11/2010 | Bauchot |
| 7,931,197 | B2 | 4/2011 | Brandt |
| 8,086,503 | B1 | 12/2011 | Mussman et al. |
| 8,284,056 | B2 | 10/2012 | McTigue |
| 2001/0049890 | A1* | 12/2001 | Hirsch et al. ................... 36/132 |
| 2002/0053076 | A1 | 5/2002 | Landesmann |
| 2002/0161652 | A1 | 10/2002 | Paullin et al. |
| 2002/0198795 | A1 | 12/2002 | Dorenbosch |
| 2007/0063029 | A1 | 3/2007 | Brandt et al. |
| 2007/0164140 | A1 | 7/2007 | Dreimann |
| 2008/0106762 | A1 | 5/2008 | Mullender et al. |
| 2009/0267783 | A1 | 10/2009 | Vock et al. |
| 2010/0141457 | A1* | 6/2010 | Wass et al. ................. 340/572.8 |
| 2010/0161379 | A1 | 6/2010 | Bene et al. |
| 2011/0093324 | A1 | 4/2011 | Fordyce, III et al. |
| 2011/0202405 | A1 | 8/2011 | Clark et al. |
| 2012/0190386 | A1 | 7/2012 | Anderson |

OTHER PUBLICATIONS

"Definition of "equivalent"", Collins English Dictionary—Complete & Unabridged 10th Edition, Source Location: HarperCollins Publishers, http://dictionary.reference.com/browse/equivalent. Available: http://dictionary.reference.com., Mar. 5, 2014.

(Continued)

*Primary Examiner* — Shay S Glass
(74) *Attorney, Agent, or Firm* — Guntin & Gust, PLC; Andrew Gust (57) ABSTRACT

A system that incorporates teachings of the present disclosure may include, for example, a device having a memory and a processor coupled to the memory. The processor can be operable to transmit a radio frequency signal directed to a radio frequency identifier tag carried by a first item, receive usage information from the radio frequency identifier tag, determine a measure of wear and tear of the first item from the usage information, compare the measure of wear and tear to a threshold, detect from the comparison a state of usage of the first item, and submit a notice representative of the state of usage of the first item. Other embodiments are disclosed.

17 Claims, 6 Drawing Sheets

(56) References Cited

OTHER PUBLICATIONS

"Definition of "quality" as "value" and vice versa", https://www.google.com/search?q=+quality+synonyms&sourceid=ie7&rls=com.microsoft:en-us:IE-Search Box& ie=&oe=, Mar. 5, 2014.

"Definition of to "replace"", Dictionary.com, unabridged, Source Location: Random House, http://dictionary.reference.com/browse/replace. Available: http://dictionary.reference.com, Mar. 5, 2014.

* cited by examiner

METHOD AND APPARATUS FOR MONITORING USAGE OF ITEMS

FIELD OF THE DISCLOSURE

The present disclosure relates generally to method and apparatus for monitoring usage of items.

BACKGROUND

It is common for consumers to purchase replacement items when they perceive that an item such as a clothing item is out of style or has exceeded its useable life. The purchasing behavior of consumers can often be dictated by perception, seasonal trends, aging of the consumer, a change in the consumer's environment that influences the consumer's behavior, friends, family, local economy, national economy, employment, and so on.

DETAILED DESCRIPTION

The present disclosure describes, among other things, illustrative embodiments for monitoring usage of an assortment of items, measuring usage of such items, and identifying replacement items according to the measured usage. Other embodiments are contemplated by the present disclosure.

One embodiment of the present disclosure includes a device having a memory and a processor coupled to the memory. The processor can be operable to receive usage information from a radio frequency identifier tag carried by a first item, determine a measure of wear and tear of the first item from the usage information, compare the measure of wear and tear to a threshold, detect from the comparison a state of usage of the first item, and generate a notice representative of the state of usage of the first item.

One embodiment of the present disclosure includes an item having a radio frequency identifier tag, a sensor for sensing usage of the item, a memory for storing information associated with the item, and a processor coupled to the radio frequency identifier tag, the sensor, and the memory. The processor can be operable to store usage information generated by the sensor responsive a detected usage of the item, receive by way of the radio frequency identifier tag a request for the stored usage information, and transmit the usage information to a device initiating the request to enable the device to determine a measure of usage of the item and to determine from the measured of usage of the item whether replacing the item is warranted.

One embodiment of the present disclosure includes a method for receiving information from a transmitter coupled to a first consumer item, determining a measure of usage of the first consumer item according to the information, monitoring a behavior of a user of the first consumer item, identifying from the behavior of the user a second consumer item to replace the first consumer item responsive to determining that the measure of usage of the first consumer item exceeds a replacement threshold, and submitting a notice identifying the second consumer item.

Figure 1:
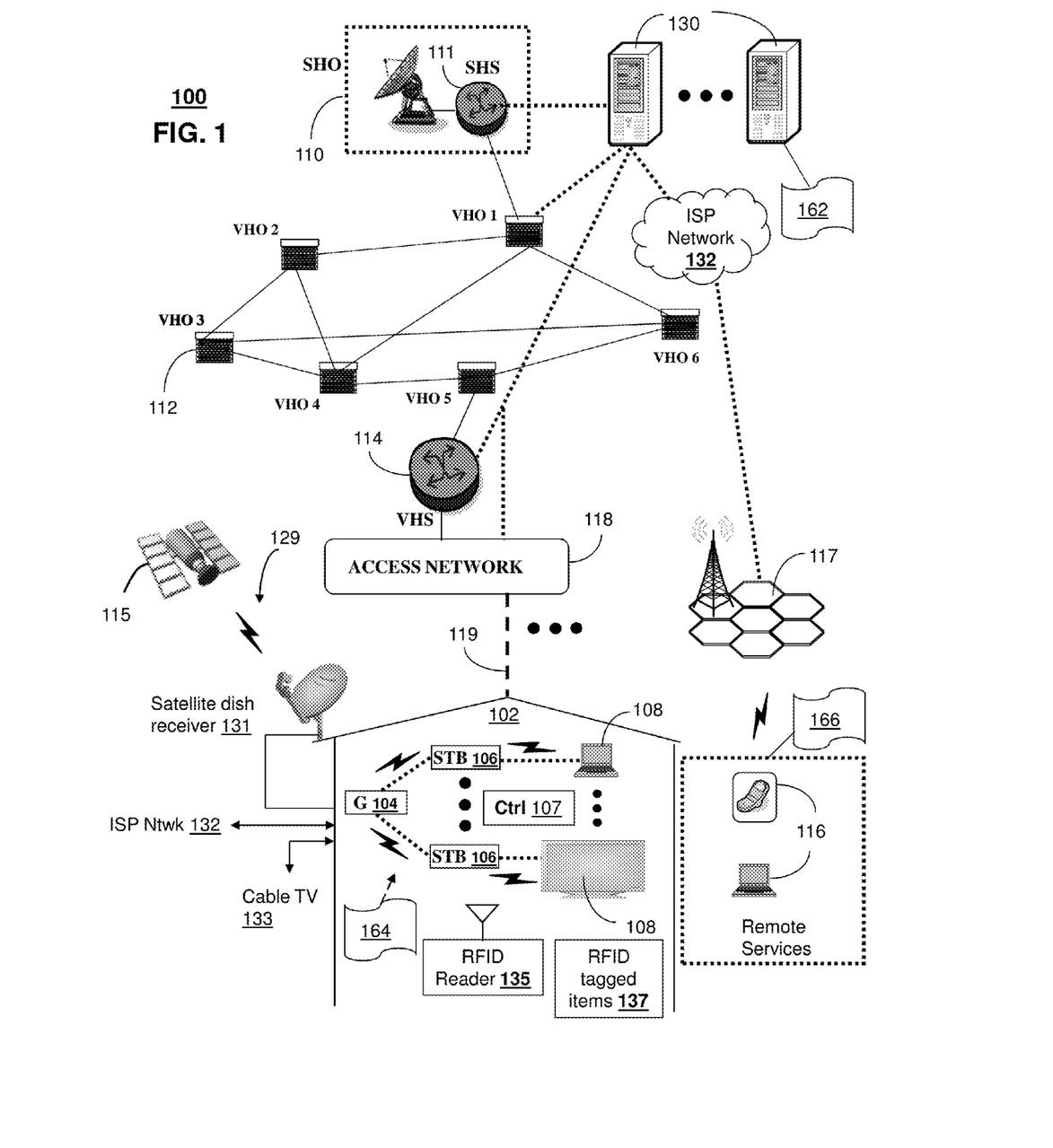
FIGS. 1-2 depict illustrative embodiments of communication systems that provide media services.
Figure 6:
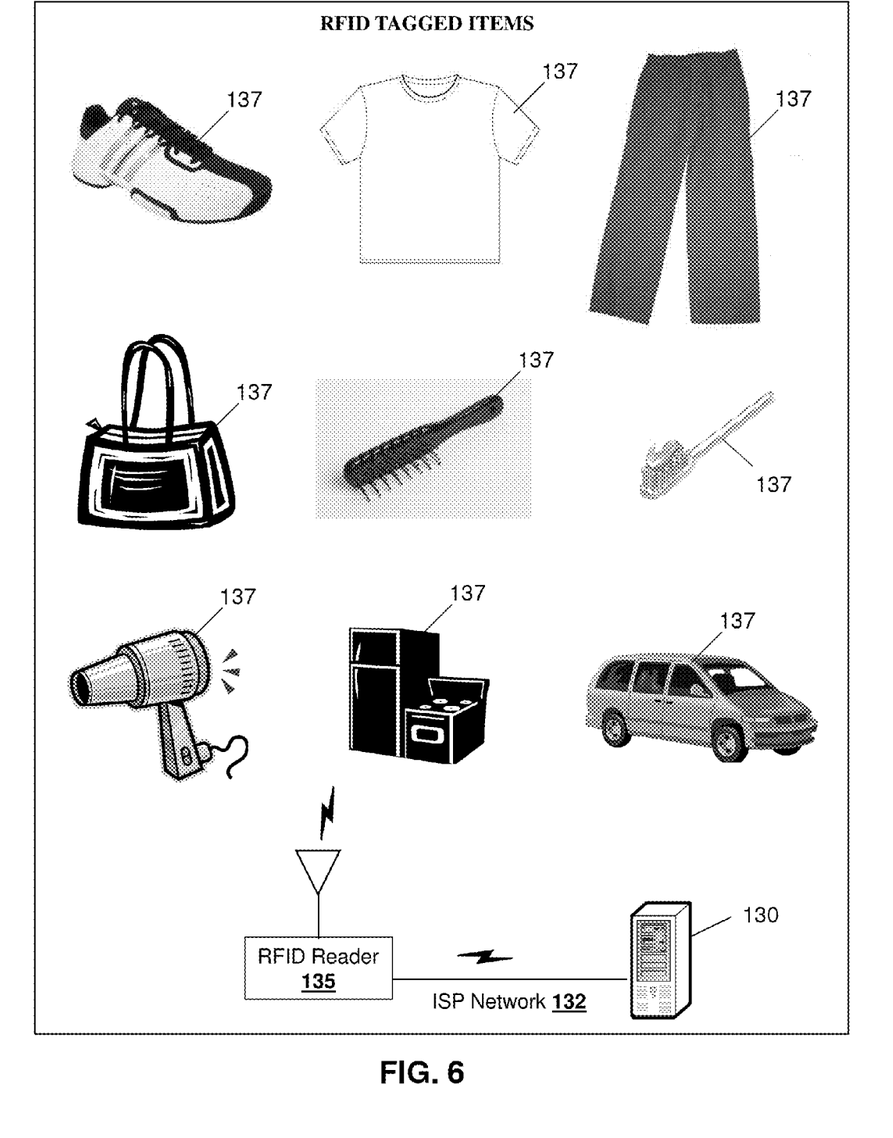
FIG. 6 depicts illustrative embodiments of items that can be monitored according to the method of FIG. 5.

FIG. 1 depicts an illustrative embodiment of a first communication system 100 for delivering media content. Communication system 100 can also be operable to monitor usage of an assortment of items. Communication system 100 can monitor usage from wireless sensors such as a radio frequency identifier (RFID) tag coupled to each item. Usage information supplied by an RFID tag can be used to measure utilization of the item and therefrom a determination can be made whether replacement of the item is warranted. The type of items that can be measured for usage can be expansive. For example, the communication system 100 can be operable to measure the usage of apparel, appliances, shoes, handbags, toiletries, and so on, such as shown in FIG. 6. Other items are contemplated by the present disclosure.

Returning to FIG. 1, the communication system 100 can represent an Internet Protocol Television (IPTV) media system. The IPTV media system can include a super headend office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a server for monitoring usage of an assortment of items (herein referred to as server 130). The server 130 can use computing and communication technology to perform function 162, which can include among things, monitoring usage of an assortment of RFID tagged items 137. The RFID tagged items 137 can include passive or active RFID technology which can be prompted to supply usage information to an RFID reader 135 such as shown in FIG. 1. Passive RFID technology can represent an RFID tag that can be powered by a radio frequency signal generated by the RFID reader 135 and therefrom generate a corresponding radio frequency wave that includes information which can be detected by the RFID reader 135. Active RFID technology can represent an RFID tag which has its own source of power (e.g., battery powered). In either case, the data supplied by the RFID tag can be received by the RFID reader 135. The RFID reader 135 in turn can be coupled to the ISP network 132 by way of a wired Ethernet connection provided by gateway 104 or by wireless means such as WiFi. By way of the ISP network 132, the RFID reader 135 can convey to the server 130 the usage information received from the RFID tagged items 137 for processing.

Each of the RFID tagged items 137 can include a memory for storing information which can be used for determining usage of the item. The information stored can include among other things a purchase price at a time when the first item was purchased, an identification of a merchant who sold the first item, a date when the first item was sold, a description of the first item, and a description of warranty information associated with the first item. The RFID tagged items 137 can further include sensor technology to measure usage of the item. The sensor technology can include without limitation a motion sensor, a weight sensor, and a location sensor. The usage information derived from these sensors can include motion data, weight data, and location data. Other sensors such as temperature sensor, a pressure sensor or other forms of sensing devices which can produce data that can be used to measure the wear and tear of an item are contemplated by the present disclosure.

The server 130 can measure usage of the tagged RFID items 135 from the supplied usage information. The server 130 can also monitor behavioral patterns from the usage information and behavior of users of the items. In one embodiment, the server 130 can determine whether the item should be replaced according to the measured usage and the detected usage patterns and behavior of the user. The media processors 106 and wireless communication devices 116 can be adapted with software functions 162 and 164, respectively, to utilize the services of server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Figure 2:
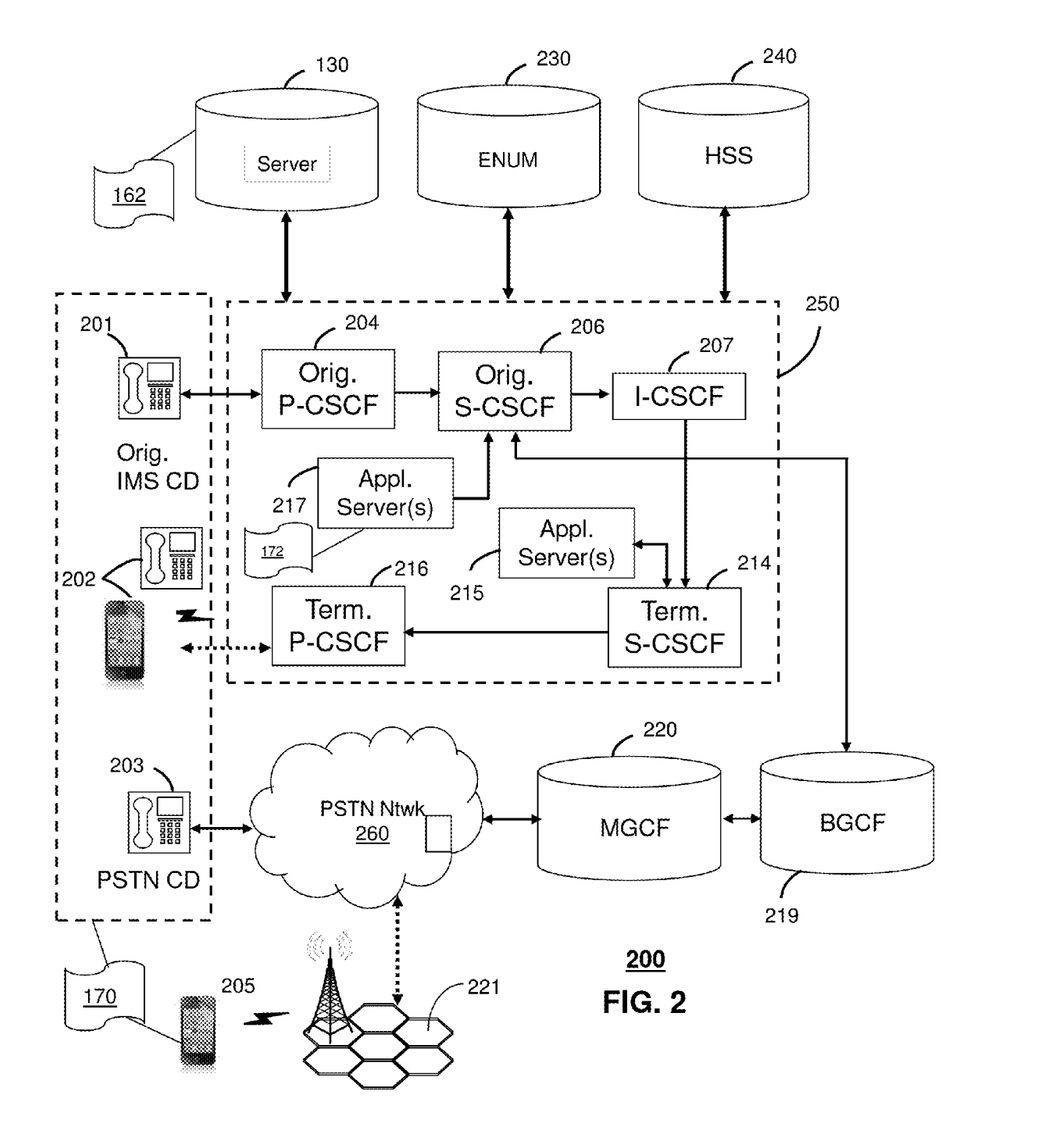

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

The server 130 of FIG. 1 can be operably coupled to the second communication system 200 for purposes similar to those described above. It is further contemplated by the present disclosure that server 130 can perform function 162 and thereby provide monitoring services to the CDs 201, 202, 203 and 205 of FIG. 2. CDs 201, 202, 203 and 205, which can be adapted with software to perform function 170 to utilize the services of the server 130. It is further contemplated that the server 130 can be an integral part of the application server(s) 217 performing function 172, which can be substantially similar to function 162 and adapted to the operations of the IMS network 250.

Figure 3:
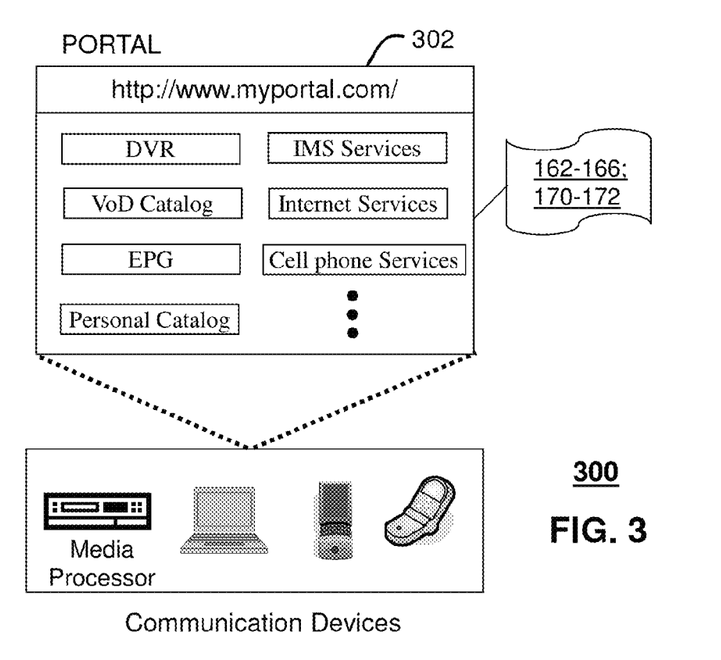
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-166, and 170-172 to adapt these applications as may be desired by subscribers and service providers of communication systems 100-200.

Figure 4:
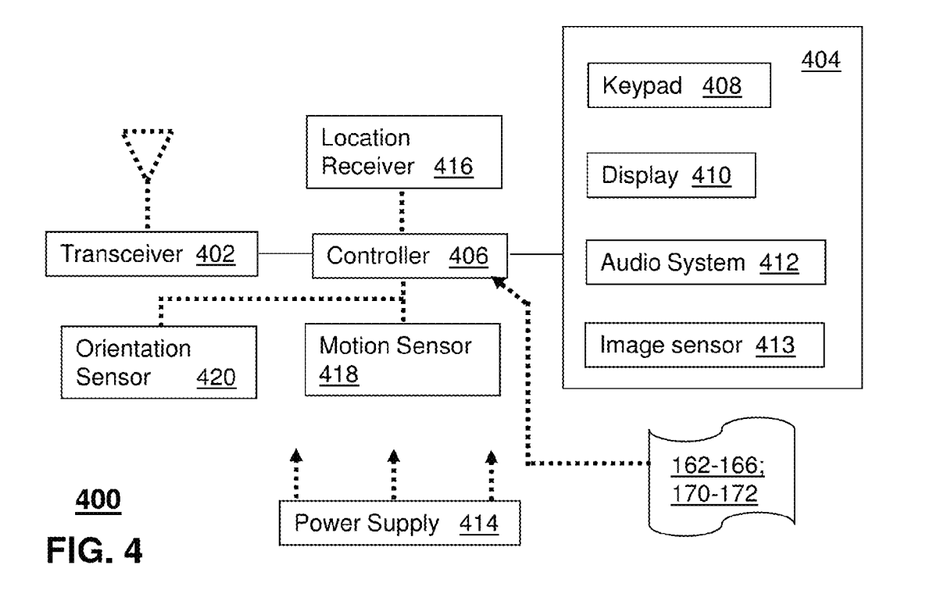
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a compass to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the present disclosure that the communication device 400 shown in FIG. 4 or portions thereof can serve as a representation of one or more of the devices of communication systems 100-200.

It is further contemplated that the controller 406 can be adapted in various embodiments to perform the functions 162-166 and 170-172, respectively. It is further contemplated that the communication device 400 can represent the RFID reader 135 and an RFID tag of the RFID tagged item 137 of FIGS. 1 and 6. The RFID reader 135 can, for example, include the transceiver 402, controller 406, and power supply 414 portions of FIG. 4. The RFID tagged item 137 can include similar components. For RFID tagged items 137 that measure usage of the item, sensors can also be added to communication device 400. The sensors can be of any type such as a temperature sensor, a humidity sensor, a lighting sensor, a pressure sensor, a motion sensor, an orientation sensor (e.g., compass), a location sensor (e.g., GPS), an image sensor, a weight measurement sensor, and so on.

Figure 5:
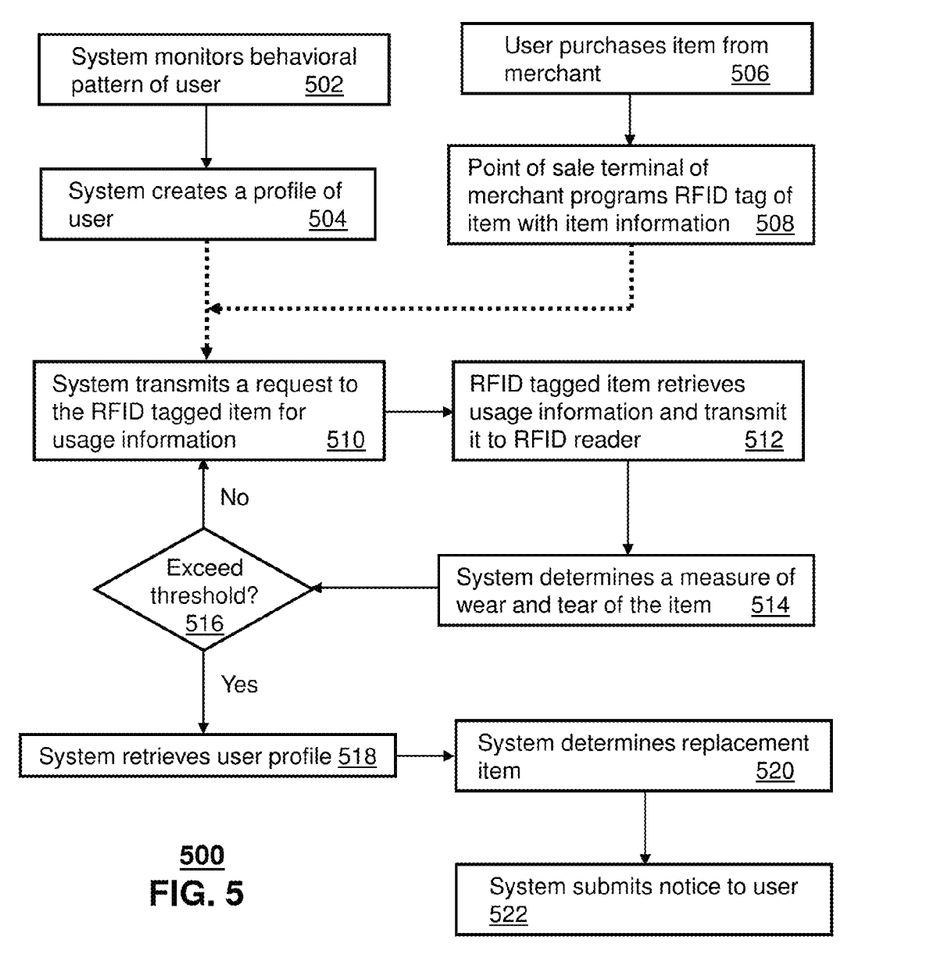
FIG. 5 depicts an illustrative embodiment of a method operating in portions of the systems described in FIGS. 1-5.

FIG. 5 depicts an illustrative method 500 that operates in portions of the devices of FIGS. 1-4. Method 500 can begin with step 502 in which a system monitors the behavior patterns of a user. The behavior patterns can represent the user's patterns for media consumption (TV, movies, music, etc.). The behavior patterns can also represent demographic and/or psychographic patterns of the user. Demographic patterns can be determined from subscription information of the user such as age, income bracket, family size, married, unmarried, credit history, and so on. Psychographic patterns can be determined from predictable traits or habits of the user. Such traits might indicate, for example, that the user likes to travel, likes to go on camping and hiking trips, is sports oriented actively (e.g., plays soccer and softball) and is an avid consumer of sports media content (TV, magazines).

The system can represent the server 130 which can gather consumption behavior from media content consumed by way of communication systems 100-200. Alternatively, the media processor 106 (e.g., STB 106) can collect behavior information relating to media consumption and submit this information to the server 130. The server 130 can assess demographic information by retrieving information from a subscriber account associated with the user. The server 130 can also determine psychographic patterns of the user by tracking the user's activities. For example, the server 130 can track Internet traffic generated by computing devices of the user. The server 130 can further track the whereabouts of the user with GPS coordinate information provided by portable devices as described in FIG. 4. From the whereabouts of the user and the media content consumed by the user, the server 130 can begin to identify specific traits and habits of the user, which can be used to develop a psychographic profile of the user.

In addition, the server 130 can be adapted to track purchases made by the consumer such as wearables (e.g., clothing, jewelry), carry-ons (e.g., wallet, purse), electronics (e.g., smart phone, computer, tablet), appliances (refrigerator, dishwasher, microwave), transportation (e.g., ticket for commuter train, purchase of a car or motorcycle), and so on. Purchases can be tracked by detecting a purchased item with an RFID tag as will be described below. The server 130 can also be adapted to monitor social networks of the user and determine therefrom the user's friend and/or family.

The server 130 and/or the STB 106 can be adapted to monitor the above activities of the user and determine a behavioral pattern which can be stored in step 504 in a profile assigned to the user. Steps 502-504 can occur as background activities that the server 130 and/or media processor 106 conduct periodically.

When a user purchases an item in step 506, the merchant can program an RFID tagged item 137 with a point of sale terminal. A point of sale terminal can represent, for example, a barcode scanner that is portable or attached to a fixed structure. The point of sale terminal can be equipped with an RFID reader 135 such as shown in FIGS. 1 and 6 for exchanging messages with the RFID tagged item 137 of FIG. 6. When the purchase is consummated by way of a cash or credit transaction, the RFID reader 135 of the point of sale terminal can be directed to transmit at step 508 information to be stored in the RFID tagged item 137. The information can include among other things a purchase price at a time when the item was purchased, an identification of the merchant who sold the item, a date when the item was sold, a description of the item, and a description of warranty information associated with the item. The RFID tagged item 137 can store the information supplied by the point of sale terminal in non-volatile memory for later usage.

At step 510, the system can transmit a request to the RFID tagged item 137 for usage information. This step can represent the server 130 transmitting a request to the RFID reader 135 to initiate this request with the RFID tagged item 137. Communications between the server 130 and the RFID reader 135 can occur over the ISP network 132 over a wireline interface (e.g., DSL) or over a cellular network 117 communicatively coupled to the ISP network 132 such as shown in FIG. 1. Upon receiving the server request, the RFID reader 135 can transmit an RF signal to the RFID tagged item 137 to prompt transmission of usage information. For passive RFID tagged items 137, the RF signal powers the RFID tag to transmit a responsive RF signal that can include the requested information.

For active RFID tagged items 137, which have their own source for power (e.g., battery-powered RFID tag), more sophisticated responses can be expected. For example, active RFID tagged items 137 can be equipped with sensors to measure usage of the item. The sensor technology can include without limitation a motion sensor (e.g., accelerometer, gyroscope), a weight sensor, an orientation sensor, and a location sensor (e.g., GPS). The usage information derived from these sensors can include motion data, weight data, orientation data, and location data. Other sensors such as temperature sensor, a pressure sensor or similar devices which can produce data that can be used to measure the wear and tear of an item are contemplated by the present disclosure. These sensors can be directed by the active RFID tagged item 137 to periodically sense information which can be recorded in a non-volatile memory of the active RFID tagged item 137.

For example, in the case of an RFID tagged item 137 such as a sneaker shown in FIG. 6, a motion sensor coupled to an active RFID tag of the RFID tagged item 137 can be used to track how many steps a user of the sneaker takes on each usage event. The active RFID tag of the sneaker can detect via the motion sensor an initial motion (e.g., a user placing his/her foot in the sneaker) which begins the monitoring process to measure how many footsteps are taken by the user. When the sneaker is detected to be in a standstill state (e.g., user removes sneaker), the active RFID tagged item 137 can cease the monitoring process and switch to a sleep mode state (i.e., nearly no processing) to extend battery life.

The RFID tagged item 137 (in this illustration the sneaker of FIG. 6) can supply the aggregate number of footsteps measured to the RFID reader 135 in step 512 which the RFID reader 135 submits to the server 130. In step 512, the RFID tagged item 137 can also provide information recorded at the time of purchase (e.g., date of purchase, description of merchant) such as described at step 508. The server 130 can determine at step 514 a measure of wear and tear of the item from the total number of footsteps taken and/or the point of sale information provided by the RFID tagged item 137.

In one embodiment, the RFID tagged item 137 (continuing with the illustration of the sneaker of FIG. 6) can be equipped with yet more sensors which can provide a more accurate measure of wear and tear. For instance, the sneaker can be equipped with a location sensor to track the whereabouts of the user. The sneaker can also be equipped with a pressure sensor that measures the impact the sneaker has on the ground. The location information if supplied to the server 130 in step 512 can be used to determine the terrain where the sneaker was used. For example, the server 130 can determine that the sneaker was used on grass terrain to determine the degree of wear and tear applied to the sole of the sneaker. The impact data supplied by a pressure sensor can be used by the server 130 to more accurately determine a measure of wear and tear.

At step 516, the server 130 can be adapted to compare the measured wear and tear of the sneaker with a predetermined threshold. The measured wear and tear can represent a measure of how much the sole of the sneaker has been worn down (e.g., loss in X millimeters of thickness). The wear and tear measurement can also be determined from the age of the sneaker which can be determined from a comparison of the date when the measurement is taken and the purchase date recorded in the RFID tagged item 137 by the point of sale terminal. The threshold can be established by the manufacturer of the sneaker or by an objective third party (such as a consumer not-for-profit organization) that presents thresholds that are viewed as unbiased. If the threshold is not exceeded (e.g., the sneaker has been not been frequently worn and/or the sneaker has not exceeded an end of life age limit), the server 130 can proceed to step 510 and repeat the monitoring process at a later time (e.g., a week later). If the threshold is exceeded (e.g., the sneaker has lost too much sole and/or has exceeded its end of life age limit), the server 130 can retrieve in step 518 a user profile to determine the interests of the user. The user profile can include behavioral patterns determined in steps 502-504 along with demographic and psychographic data.

In step 520, the server 130 can determine a replacement item on the basis of the user profile and/or point of sale information such as the purchase date, the purchase price at the time when the item was purchased, the identification of the merchant who sold the item, the description of the item, and the description of warranty information associated with the item as described earlier for step 508. The server 130 can, for example, compare the profile of the user with the point of sale information to determine whether a substantially similar or equivalent replacement item should be searched, or whether the monitored behavior of the user shows new biases which may indicate that the user is inclined to change to a new style or manufacturer of sneakers. If the psychographic data collected on the user shows that the user's clothing style is changing, then the server 130 can correlate a search for a replacement sneaker with this new trend. If, on the other hand, the user's psychographic data is consistent with psychographic data captured for the user at the time the sneaker was purchased, then the server 130 can determine that an equivalent or substantially similar replacement sneaker would be appropriate.

The server 130 can also detect changes in the demographic profile of the user. For example, the server 130 can determine that the income of the user may have risen or dropped, credit score may have also changed, or the user may have aged a year since the purchase (which for teenagers may be significant). Although the psychographic profile may remain consistent, the server 130 may determine from the demographic data that the user may be amenable to an upgrade or downgrade of the sneaker.

In step 520, the server 130 can search databases of manufacturers to determine availability of sneaker models that most closely matches the user's profile. If more than one model and/or manufacturer is found, the server 130 can present in step 522 each of these models in ranking order (e.g., starting with closest match). The server 130 can submit this notice as an email, an SMS or MMS message, or other suitable means of communication. The server 130 can also determine whether it would be helpful to the user to purchase the proposed sneaker at the same retailer. This determination can be based on pricing by the retailer of the models selected by the server 130 as compared to other retailers selling the same model. In one embodiment, the server 130 can also provide on-line purchase options for direct delivery to the user without requiring the user to visit a physical establishment.

Upon reviewing the aforementioned embodiments, it would be evident to an artisan with ordinary skill in the art that said embodiments can be modified, reduced, or enhanced without departing from the scope and spirit of the claims described below. Method 500 as described above can be applied to any item that can be equipped with a passive, active or other suitable form of an RFID tag. For instance, method 500 can be adapted to monitor usage of apparel, hand bags, hair brushes, tooth brushes, blow dryers, appliances, automobiles, and so on such as shown in FIG. 6. Additionally, these items can be equipped with any form of sensing devices that can enhance the ability of the server 130 to more accurately determine the usage of the item. Method 500 can also be adapted so that the server 130 and the RFID reader 135 are housed in the same device and located at the user's residence, work place, or in other locations which can track the user's items. Other embodiments are contemplated by the present disclosure.

Method 500 can be further adapted so that the server 130 is operable to account for health factors of the user. For example, the server 130 can monitor whether the user has gained weight or lost weight. The server 130 can monitor a change in weight by retrieving medical records of the user, or from sensor data supplied by a weight or pressure sensor coupled to an RFID tagged item 137 such as a shoe. A change in the user's weight can be used as a factor by the server 130 to search for replaceable items. Other health factors that can be considered by the server 130 such as a change in height of the user, a diagnosis of a disease (e.g., diabetes) that may require a change in apparel (e.g., shoes, socks), and so on.

Method 500 can also be adapted so that the server 130 is operable to monitor the user's disposal of RFID tagged items 137. A waste basket can be equipped with an RFID reader 135 that detects the presence of an RFID tagged item 137 in the basket. Disposal of the RFID tagged item 137 can also be detected with location coordinates provided by a location sensor (e.g., GPS sensor) of the RFID tagged item 137, which may indicate the RFID tagged item 137 is in the location of a waste basket which is generally not relocated. An RFID tag with a location sensor can be added to the waste basket. The server 130 can be adapted to compare the location of the waste basket and the RFID tagged item 137 according to location coordinates received from the basket and the RFID tagged item 137. If a match exists, a disposal can be detected. Other methods for detecting the disposal of an RFID tagged item 137 can be used.

Once the server 130 detects the disposal of an RFID tagged item 137, it can retrieve usage information to make additional determinations that may be useful in assessing replacement items. For example, the server 130 can determine that the disposal was premature and compare the user's next purchase of a similar item to determine why the user may have disposed the item. For example, the server 130 may detect that a new purchase differs from the disposed item in size (e.g., larger shoe size). This determination can be used by the server 130 to track the user's physiological changes. The server 130 can also retrieve the usage information from the disposed RFID tagged item 137 and determine that the item experienced wear and tear that exceeded the manufacturer's expected wear and tear threshold. The server 130 can collect this information and determine a wear and tear profile of the user (e.g., excessive or light user of certain consumer items) that may be different than the manufacturer's model. The wear and tear profile of the user can be used for determining replacement items as well as for predicting a threshold for end of life of the consumer item.

Figure 7:
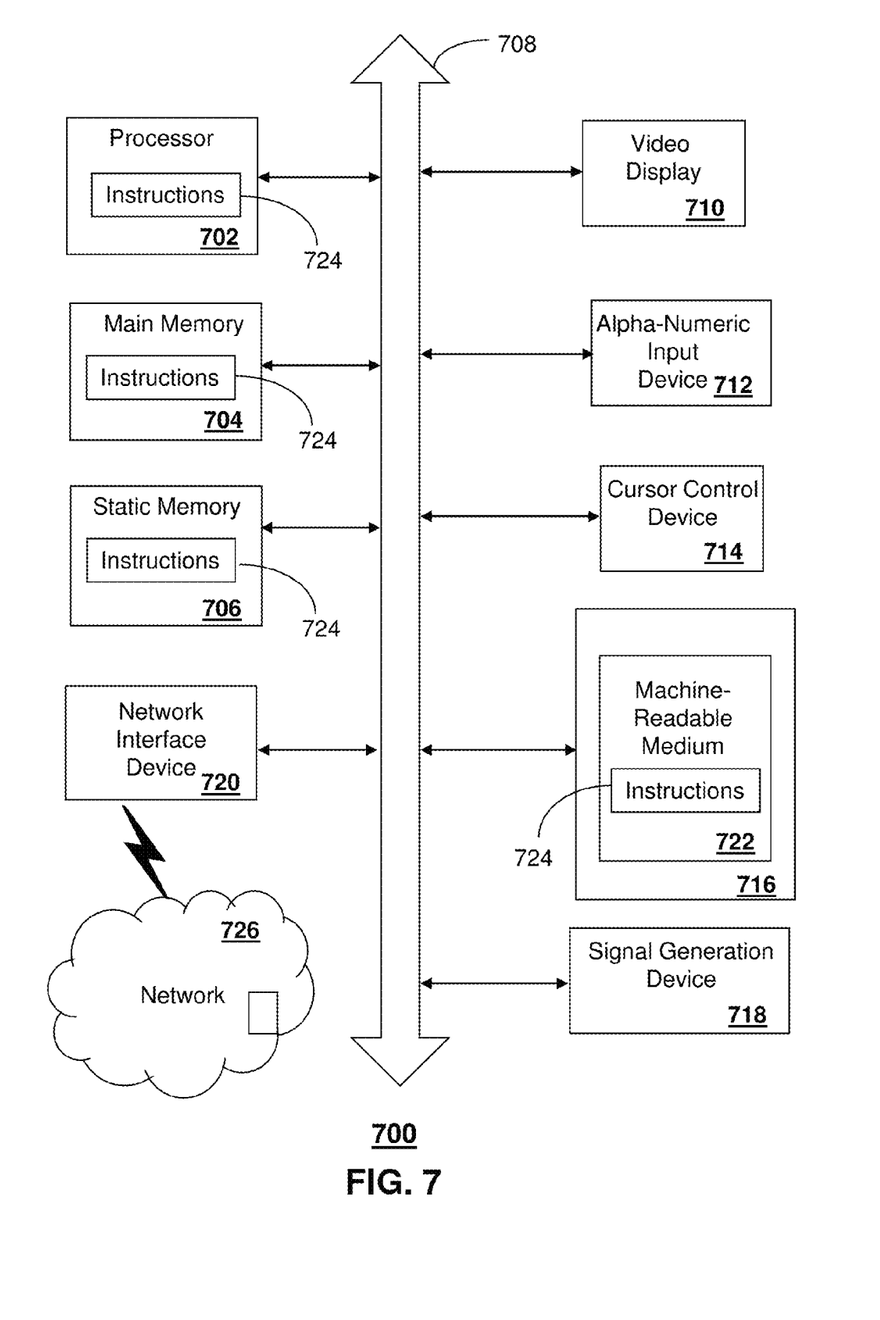
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the server 130, media processor 106, the RFID reader 135, the RFID tags carried by the RFID tagged items 137, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory to store executable instructions; and
a processor coupled to the memory, wherein upon execution of the executable instructions, the processor performs operations comprising:
collecting media consumption behavioral data according to media content consumed by a user of a media distribution system;
collecting demographic information that is associated with a subscription account of the user;
collecting location information from a portable device of the user;
determining a user profile according to the media consumption behavior data, the demographic information, and the location information;
receiving a measure of wear associated with a first item, wherein the first item comprises a shoe, wherein the measure of wear is received from the first item by way of a radio frequency identifier tag that is carried by the first item, wherein the measure of wear comprises a plurality of wear observations that are tracked at the first item, wherein each wear observation of the plurality of wear observations is captured by a sensor that is carried on the first item, and wherein the first item aggregates each wear observation of the plurality of wear observations that is captured to generate the measure of wear;

determining whether the measure of wear that is received exceeds a threshold; and responsive to the determining that the measure of wear exceeds the threshold:

receiving, from the first item, point of sale information, wherein the point of sale information was stored at the first item by way of the radio frequency identifier tag when the first item was transferred to the user;

identifying a replacement item for the first item according to information in the user profile and the point of sale information; and sending a message associated with the replacement item to the portable device of the user.

2. The device of claim 1, wherein the processor comprises a plurality of processors operating in a distributed processing environment, wherein the point of sale information comprises one of a description of the first item, warranty information that is associated with the first item, or a combination thereof.

3. The device of claim 1, wherein a point of sale terminal transmits to the radio frequency identifier tag a radio frequency signal comprising a the point of sale information.

4. The device of claim 1, wherein the operations comprise:

determining a replacement proposal comprising one of replacing the first item with a second item having substantially similar characteristics to the first item or replacing the first item with a third item having a plurality of distinct characteristics to the first item.

5. The device of claim 4, wherein the second item represents a lateral replacement of the first item, and wherein the third item represents a non-lateral replacement of the first item.

6. The device of claim 1, wherein the operations further comprise:

collecting activity information from the portable device of the user; and determining a psychographic pattern of behavior of the user according to the activity information, wherein the user profile further comprises the psychographic pattern of behavior.

7. The device of claim 1, wherein the operations comprise updating the user profile responsive to the determining that the measure of wear exceeds the threshold.

8. The device of claim 1, wherein the point of sale information comprises one of a purchase price at a time when the first item was purchased, an identification of a merchant who sold the first item, a date when the first item was sold, or a combination thereof.

9. The device of claim 1, wherein the radio frequency identifier tag is one of an active or passive radio frequency identifier tag.

10. The device of claim 1, wherein the first item comprises one of a food item, a transportation item, a fixture item, or an appliance item.

11. The device of claim 1, wherein the sensor is coupled to the radio frequency tag, and wherein the operations further comprise:

transmitting a radio frequency signal directed to the radio frequency identifier tag; and receiving the measure of wear from the sensor responsive to the transmitted radio frequency signal.

12. The device of claim 1, wherein the first item further comprises one of a weight sensor or a location sensor.

13. A non-transitory machine-readable storage medium, comprising executable instructions that, when executed by a processor, facilitate performance of operations, comprising:

collecting media consumption behavioral data according to media content consumed by a user of a media distribution system;

collecting demographic information that is associated with a subscription account of the user;

collecting location information from a portable device of the user;

determining a user profile according to the media consumption behavior data, the demographic information, and the location information;

receiving a measure of wear associated with a first item, wherein the first item comprises a shoe, wherein the measure of wear is received from the first item by way of a radio frequency identifier tag that is carried by the first item, wherein the measure of wear comprises a plurality of wear observations that are tracked at the first item, wherein each wear observation of the plurality of wear observations is captured by a sensor that is carried on the first item, and wherein the first item aggregates each wear observation of the plurality of wear observations that is captured to generate the measure of wear;

determining whether the measure of wear that is received exceeds a threshold; and responsive to the determining that the measure of wear exceeds the threshold:

receiving, from the first item, point of sale information, wherein the point of sale information was stored at the first item by way of the radio frequency identifier tag when the first item was transferred to the user;

identifying a replacement item for the first item according to information in the user profile and the point of sale information; and sending a message associated with the replacement item to the portable device of the user.

14. The non-transitory machine-readable storage medium of claim 13, wherein the processor comprises a plurality of processors operating in a distributed processing environment, wherein the operations further comprise determining a replacement proposal comprising one of replacing the first item with a second item having substantially similar characteristics to the first item or replacing the first item with a third item having a plurality of distinct characteristics to the first item.

15. The non-transitory machine-readable storage medium of claim 14, wherein the second item represents a lateral replacement of the first item, and wherein the third item represents a non-lateral replacement of the first item.

16. A method, comprising:

collecting, by a system comprising a processor, media consumption behavioral data according to media content consumed by a user of a media distribution system;

collecting, by the system, demographic information that is associated with a subscription account of the user;

collecting, by the system, location information from a portable device of the user;

determining, by the system, a user profile according to the media consumption behavior data, the demographic information, and the location information;

receiving a measure of wear associated with a first item, wherein the first item comprises a shoe, wherein the measure of wear is received from the first item by way of a radio frequency identifier tag that is carried by the first item, wherein the measure of wear comprises a plurality of wear observations that are tracked at the first item, wherein each wear observation of the plurality of wear observations is captured by a sensor that is carried on the first item, and wherein the first item aggregates each wear observation of the plurality of wear observations that is captured to generate the measure of wear;

determining, by the system, whether the measure of wear that is received exceeds a threshold; and responsive to the determining that the measure of wear exceeds the threshold:
- receiving, by the system, from the first item, point of sale information, wherein the point of sale information was stored at the first item by way of the radio frequency identifier tag when the first item was transferred to the user;
- identifying, by the system, a replacement item for the first item according to information in the user profile and the point of sale information; and
- sending, by the system, a message associated with the replacement item to the portable device of the user.

17. The method of claim 16, wherein the processor comprises a plurality of processors operating in a distributed processing environment, wherein the point of sale information comprises one of a description of the first item, warranty information that is associated with the first item, or a combination thereof.

* * * * *